United States Patent Office 2,770,619
Patented Nov. 13, 1956

2,770,619
SUBSTITUTED 8-QUINOLINOLS

Ernst Schraufstätter, Wuppertal-Elberfeld, and Marianne Bock, Wuppertal-Sonnborn, Germany, assignors to Schenley Industries, Inc., New York, N. Y., a corporation of Delaware No Drawing. Application November 12, 1953,
Serial No. 391,768

7 Claims. (Cl. 260—240)

This invention relates to substituted 8-quinolinols and is a continuation-in-part of U. S. application Serial No. 359,658, filed June 4, 1953.

One object of this invention is new 5-acyl-7-tertiary aminomethyl-8-quinolinols in which the 5 substituent contains an aryl radical or a heterocyclic radical either directly attached or attached through an alkyl radical to the carbon atom of the CO radical. These new 5-acyl-7-tertiary aminomethyl-8-quinolinols have been found to exhibit excellent tolerability and extremely high amebicidal and bactericidal activity.

The new substituted 8-quinolinols, in accordance with the invention, have the general formula

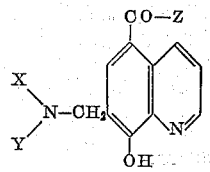

in which X and Y may be the same or different, normal or branched alkyl radicals which may contain heteroatoms or which may be substituted, as, for example, by hydroxyl groups, dialkylamino groups, or an aryl radical. The X and Y may also, together with the nitrogen atom, form a saturated heterocyclic ring, as, for example, a pyrrolidine, piperidine, cyclohexylimine, morpholine, or piperazine ring. X and Y together should not contain more than 14 C atoms. The Z in the general formula represents an aromatic or an unsaturated heterocyclic radical which may be substituted and which is attached directly to the carbonyl group or is attached to the carbonyl group by means of a normal, aliphatic saturated or unsaturated hydrocarbon chain.

The new compounds, in accordance with the invention, may be produced from the corresponding 5-acyl-8-quinolinol by the reaction thereof with formaldehyde or paraformaldehyde and a secondary amine. The starting 5-acyl-8-quinolinol must be unsubstituted in the 7 position and the CO group at the 5 position must have a member attached thereto corresponding to Z in the formula given above.

The starting 5-acyl-8-quinolinol may be prepared by reacting 8-quinolinol with the corresponding acyl chloride according to the Friedel-Crafts reaction. The use of the Friedel-Crafts reaction for the acylation of the 8-quinolinol will effect the introduction of the acyl group in the 5 position of the 8-quinolinol. The resulting 5-acyl-8-quinolinol is then reacted with formaldehyde and the amine as mentioned and the compound in accordance with the invention is produced. The above reactions proceed in the following manner:

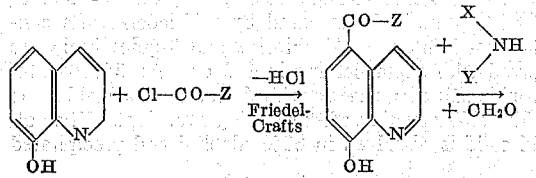

Alternatively, the new compounds may be obtained by reacting aromatic or heterocyclic aldehydes with 5-acetyl-8-quinolinol which is substituted in the 7 position with a tertiary amino methyl radical corresponding to the tertiary amino methyl radical shown in the general formula of the new compound above. The starting 5-acetyl-7-tertiary aminomethyl-8-quinolinol may be obtained by reacting 8-quinolinol and acetyl chloride according to the Friedel-Crafts reaction and reacting the resulting 5-acetyl-8-quinolinol with a secondary amine and formaldehyde.

The reactions for obtaining the new compounds in accordance with the invention may usually be accelerated by heating, but in many instances will occur at room temperature.

EXAMPLE 1

The following examples are given by way of illustration and not of limitation:

Eight and three-tenths grams of 5-benzoyl-8-quinolinol, 3.5 grams of 30% formaldehyde, 3 grams of 50% dimethylamine solution and 200 milliliters of alcohol are refluxed for four hours. The alcohol is then distilled off, the residue stirred with 3% acetic acid, filtered, and the filtrate precipitated by ammonia. The 5-benzoyl-7-dimethylaminomethyl-8-quinolinol obtained by suction filtration and recrystallizing from 40% alcohol has a melting point of 113° C. If hydrochloric acid is added to the alcoholic solution of this substance, the hydrochloride precipitates, which has a decomposition point of about 135–140° C.

By employing N,N,N'-triethylethylene-diamine instead of dimethylamine, the 5-benzoyl-7-N-ethyl-N-($\beta$-diethylaminoethyl) aminomethyl-8-quinolinol of the melting point of 54–56° C. is obtained.

EXAMPLE 2

Nine and four-tenths grams of 5-(4'-chlorobenzoyl)-8-quinolinol (melting point 216° C.; obtained from 8-quinolinol and 4-chlorobenzoyl chloride according to Friedel-Crafts), 3.5 grams of 30% formaldehyde solution, 3 grams of 50% dimethylamine solution and 500 milliliters of alcohol are refluxed for five hours. After evaporation of the alcohol, the residue is mixed with dilute hydrochloric acid and filtered. The filtrate is precipitated by ammonia. After recrystallizing from 60% alcohol, the 5-(4'-chlorobenzoyl)-7-dimethyl-aminomethyl-8-quinolinol obtained melts at 92–93° C. The hydrochloride starts to decompose at 140° C.

The 5-(4'-chlorobenzoyl)-8-quinolinol was prepared in the following manner:

Ninety grams of 8-quinolinol are dissolved in 400 cc. of nitrobenzene; 130 grams of p-chlorobenzoyl chloride are dropped in and 240 grams of aluminum chloride added gradually while cooling. After heating to 100–110° C. for 10 hours, the mixture is poured out on ice and hydrochloric acid. The precipitate is filtered by suction after standing for some time and washed with dilute hydrochloric acid and ether. The precipitate is then suspended in water, ammonia is added, the whole heated and filtered by suction after cooling. After recrystallizing from benzene, the compound has a melting point of 216° C.

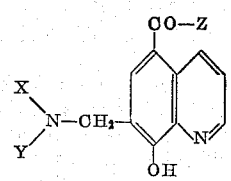

EXAMPLE 3

Eighteen and eight-tenths grams of 5-(2'-chlorobenzoyl-)-8-quinolinol (melting point 127–128° C.; prepared from 8-quinolinol and 2-chlorobenzoyl chloride according to Friedel-Crafts), 200 cc. of alcohol, 7 grams of a 30% formaldehyde solution and 7 grams of a 50% dimethylamine solution are refluxed for 2 hours. The solution is filtered by suction and the hydrochloride of 5 - (2' - chlorobenzoyl) - 7 - dimethylaminomethyl - 8-quinolinol is precipitated by means of alcoholic hydrochloric acid. The compound melts at 207° C. with decomposition after recrystallizing from alcohol.

EXAMPLE 4

The procedure of Example 3 is repeated with 5-(2',4'-dichlorobenzoyl-)-8-quinolinol as starting material (melting point 196° C.; obtained from 8-quinolinol and 2,4-dichlorobenzoylchloride). The 5-(2',4' - dichlorobenzoyl-)-8-quinolinol is condensed with formaldehyde and dimethylamine to yield the 5-(2',4'-dichlorobenzoyl)-7-dimethylaminomethyl-8-quinolinol which was isolated as the hydrochloride of the melting point 222° C. with decomposition.

EXAMPLE 5

Nine and two-tenths grams of 5-cinnamoyl-8-quinolinol are dissolved in 400 milliliters of boiling alcohol and are refluxed for five hours after adding 3.5 grams of 30% formaldehyde and 3 grams of 50% dimethylamine solution, whereupon the new compound formed precipitates. After filtering by suction while hot, the 5-cinnamoyl-7-dimethylaminomethyl-8-quinolinol of the melting point 193° C. is obtained.

The same compound is obtained by condensing in an alkaline medium the 5-acetyl-7-dimethylaminomethyl-8-quinolinol (melting point of the hydrochloride 225° C. with decomposition) obtainable from 5-acetyl-8-quinolinol by the Mannich reaction with benzaldehyde.

EXAMPLE 6

Nine and two-tenths grams of 5-cinnamoyl-8-quinolinol, 3.5 grams of 30% formaldehyde solution, 2.5 grams of diethylamine and 400 milliliters of alcohol are refluxed for four hours. Thereafter, the alcohol is evaporated disregarding precipitated materials. The residue is extracted with dilute hydrochloric acid in the cold. After filtration, the mixture is precipitated by ammonia, whereby 5 - cinnamoyl - 7 - diethylaminomethyl - 8 - quinolinol (melting point 85–90° C.) is obtained. The melting point of the hydrochloride is 180–185° C. (with decomposition).

In an analogous manner, starting with 5-cinnamoyl-8-quinolinol, in all of the following cases, the following new compounds were produced: 5-cinnamoyl-7-di-n-butyl-aminomethyl-8-quinolinol (melting point 51–53° C.) with di-n-butylamine, 5-cinnamoyl-7-di-N,N-(β-hydroxyethyl) aminomethyl-8-quinolinol (melting point 136° C.) with diethanolamine, 5-cinnamoyl-7-N-ethyl-N-(β-diethylaminoethyl) aminomethyl-8-quinolinol (melting point 85–90° C.) with N,N,N'-triethylethylenediamine and 5-cinnamoyl - 7 - N,N - bis - (β - diethylaminoethyl) - aminomethyl - 8 - quinolinol (melting point 85–90° C.) with bis-(β-diethylaminoethyl) amine.

EXAMPLE 7

Nine and two-tenths grams 5-cinnamoyl-8-quinolinol, 3.5 grams of 30% formaldehyde solution, 4.1 grams N-methyl-benzylamine and 400 milliliters of alcohol are refluxed for five hours. Thereafter, the mixture is filtered while hot, the alcohol evaporated, and the residue is recrystallized from a benzene-ligroin mixture. The 5-cinnamoyl - 7 - N - methyl - N - benzylamino - ethyl - 8 - quinolinol melts at 124° C.; its hydrochloride decomposes at 227° C.

In analogous manner, the 5-cinnamoyl - 7 - methyl - N-n-dodecylaminomethyl - 8 - quinolinol (melting point 76° C.) is formed with 5-cinnamoyl - 8 - quinolinol and N-methyl-n-dodecylamine.

EXAMPLE 8

Nine and two-tenths grams of 5-cinnamoyl-8-quinolinol, 3.5 grams of 30% formaldehyde solution, 2.5 grams of pyrrolidine and 400 milliliters of alcohol are refluxed for eight hours. Thereafter the alcohol is evaporated and the residue extracted with diluted acetic acid. After filtration, the mixture is precipitated by ammonia, suction filtered and recrystallized from alcohol. 5-cinnamoyl-7-(1-pyrrolidyl)-methyl-8-quinolinol melts at 178° C. with decomposition. Its hydrochloride decomposes at 232° C.

In the same manner, 5 - cinnamoyl - 7 - (1 - piperidyl) methyl-8-quinolinol (melting point 71–72° C.; melting point of its hydrochloride 220° C. with decomposition) is obtained from 5-cinnamoyl-8-quinolinol with piperidine, and 5-cinnamoyl-7-(4-methyl-1-piperazyl) methyl-8-quinolinol (melting point 181° C., melting point of its hydrochloride 203–204° C. with decomposition) with N-methylpiperazine.

EXAMPLE 9

Ten and three-tenths grams of 5-(4'-chlorocinnamoyl-1)-8-quinolinol (melting point 197° C.; obtainable from 5-acetyl-8-quinolinol and 4-chlorobenzaldehyde in alcoholic alkali solution), 3.5 grams of 30% formaldehyde solution, 3 grams of 50% dimethylamine solution and 400 milliliters of alcohol are refluxed for five hours. The mixture is filtered by suction while hot and evaporated until dry. After recrystallizing from alcohol, the 5 - (4'chlorocinnamoyl) - 7 - dimethylaminomethyl - 8 - quinolinol melts at 183° C. Its hydrochloride decomposes at 215–216° C.

The 5-(4'-chlorocinnamoyl-)-8-quinolinol is obtained in the following manner:

Nine and three-tenths of 5-acetyl-8-quinolinol are dissolved in 250 cc. of a 5% sodium hydroxide solution and shaken with 7 grams of p-chlorobenzaldehyde dissolved in 20 cc. of alcohol. After standing overnight, the precipitate is filtered by suction, dissolved in a small amount of alcohol and precipitated with acetic acid. The melting point is 197° C. after recrystallizing from alcohol.

EXAMPLE 10

Analogous to Example 6, 5-β-phenylpropionyl-7-dimethylaminomethyl-8-quinolinol is obtained from 5-β-phenylpropionyl-8-quinolinol, formaldehyde and dimethylamine. The compound melts at 88–90° C.

EXAMPLE 11

Analogous to Example 8, the 5-ω-cinnamal-acetyl-7-dimethylaminomethyl-8-quinolinol (5-(1-phenyl-1,3-pentadienoyl) - 7 - dimethylaminomethyl - 8 - quinolinol) is obtained from 5 - ω - cinnamalacetyl - 8 - quinolinol (5-(1-phenyl-1,3-pentadienoyl)-8-quinolinol) (melting point 129° C.; obtainable from 5-acetyl-8-quinolinol and cinnamaldehyde by alkaline condensation with formaldehyde and dimethylamine.) The compound melts after recrystallizing from ligroin at 73–74° C.; its hydrochloride decomposes at 140° C.

For the production of the 5-(1-phenyl-1,3-pentadienoyl)-8-quinolinol, melting point 129° C., the procedure as set forth at the end of Example 9 is repeated using 5-acetyl-8-quinolinol and cinnamaldehyde.

EXAMPLE 12

*5-benzoylacetyl-7-dimethylaminomethyl-8-quinolinol*

(a) 5-benzoylacetyl-8-quinolinol; 11 grams of 5-chloroacetyl-8-quinolinol (prepared by a Friedel-Crafts condensation of chloroacetyl chloride and 8-quinolinol) are dissolved with slight heating in 155 cc. of a 3% sodium hydroxide solution, shaken with 6 grams of benzaldehyde and filtered by suction after standing overnight. The collected solid is dissolved in 60% alcohol and precipitated with acetic acid. After recrystallizing from alcohol, the compound melts at 125° C.

(b) Eight and seven-tenths grams of 5-benzoylacetyl-8-quinolinol are dissolved in 200 cc. alcohol with slight warming and 3 grams of a 50% dimethylamine solution and 3 grams of a 30% formaldehyde solution are added. The mixture is heated for a short period in the water bath, cooled and filtered by suction. After recrystallizing from alcohol, the 5-benzoylacetyl-7-dimethylaminomethyl-8-quinolinol melts at 188° C. with decomposition. The hydrochloride of this compound decomposes at 175° C.

EXAMPLE 13

Eight and three-tenths grams of 5-(3',4'-dimethoxycinnamoyl)-8-quinolinol having a melting point of 185° C. and obtainable by condensation of 5-acetyl-8-quinolinol with veratraldehyde in an alkaline medium, are refluxed for 90 minutes together with 250 cc. of ethanol, 2.5 grams of a 30% formaldehyde solution and 2.5 grams of a 50% dimethyl amine solution. The solution is filtered while hot and the filtrate allowed to crystallize. A crystalline residue is formed which is recovered by filtration. It is 5 - (3',4' - dimethoxycinnamoyl) - 7 - dimethylaminomethyl - 8 - quinolinol which melts at 132° C. and form a hydrochloride melting at 232° C. with decomposition. The total reaction proceeds as follows:

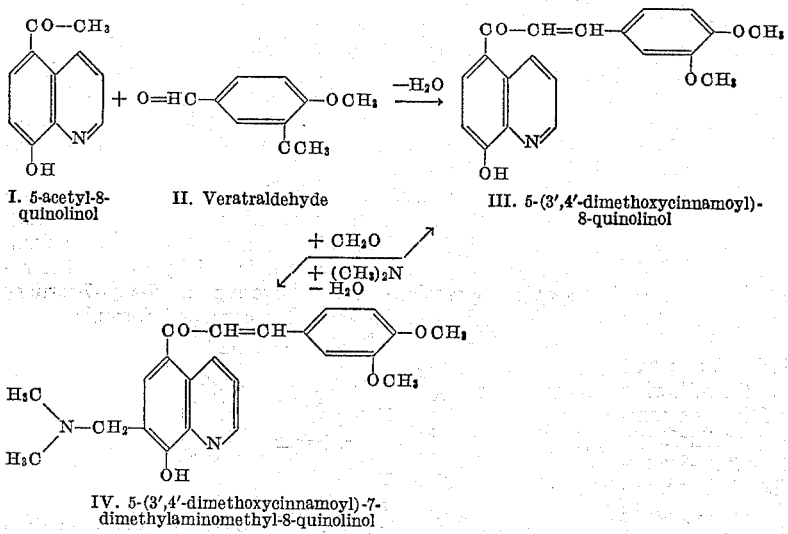

EXAMPLE 14

Six and eight-tenths grams of 5-furfurylidene acetyl-8-quinolinol, having a melting point of 154° C. and obtainable from 5-acetyl-8-quinolinol and furfural in an alkaline medium, is heated for an hour on the water bath with 250 cc. of ethanol, 2.6 grams of a 30% formaldehyde solution and 2.6 grams of a 50% dimethylamine solution. After cooling, the residue is recovered by suction filtration and recrystallized from ethanol. It is 5-furfurylidene acetyl-7-dimethylaminomethyl-8-quinolinol which has a melting point of 190° C. It forms a hydrochloride of the melting point of 220° C. This reaction may be represented as follows:

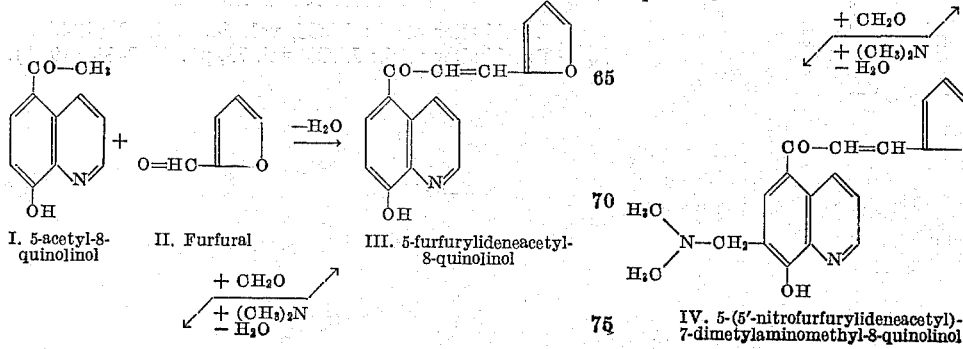

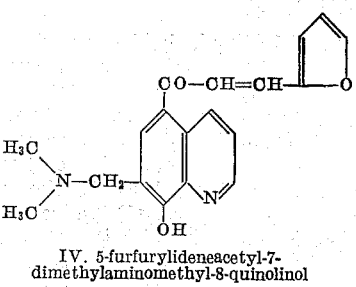

IV. 5-furfurylideneacetyl-7-dimethylaminomethyl-8-quinolinol

EXAMPLE 15

Eight and eight-tenths grams of 5-(5'-nitrofurfurylidene acetyl)-8-quinolinol (melting point 190° C., obtained by heating in acetic anhydride 5-acetyl-8-quinolinol and 5-nitrofurfural and following deacetylation with dimethylamine) are refluxed for two hours in 400 cc. of ethanol with 5 grams of a 50% dimethylamine solution and 2.5 grams of a 30% formaldehyde solution. The solution is filtered while hot and precipitated with alcoholic hydrochloric acid. There was formed the hydrochloride of 5-(5'-nitrofurfurylidene acetyl)-7-dimethylaminomethyl-8-quinolinol. Upon heating, it turns dark at 220° C. and decomposes at 254° C. This reaction may be represented as follows:

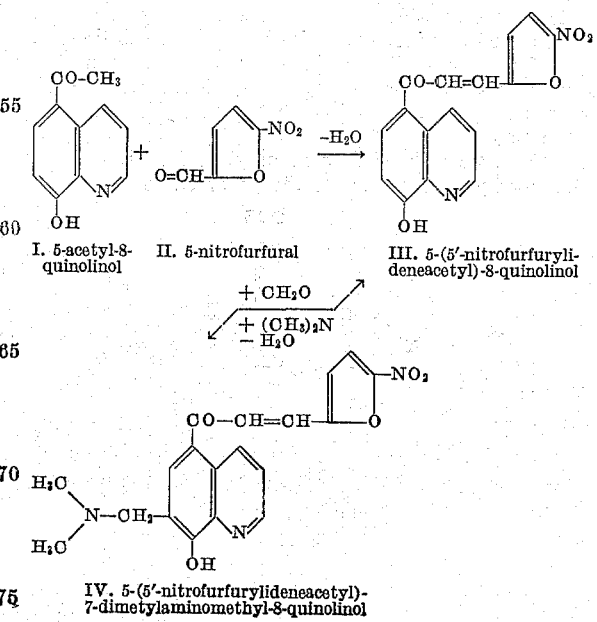

EXAMPLE 16

Six and one-half grams of 5-(6'-quinolylidene acetyl)-8-quinolinol (melting point 210° C., obtained by condensation of 5-acetyl-8-quinolinol with quinoline-6-aldehyde in an alkaline solution) are refluxed in 150 cc. of ethanol with 2 grams of a 30% formaldehyde solution and 2 grams of a 50% dimethyl amine solution. The reaction mixture is filtered while hot and the filtrate is allowed to crystallize. 5-(6'-quinolylidene acetyl)-7-dimethyl-aminomethyl-8-quinolinol is obtained, which is recrystallized from ethanol and then melts at 200° C. It yields a hydrochloride having a point of decomposition of 263–265° C. The reaction may be represented as follows:

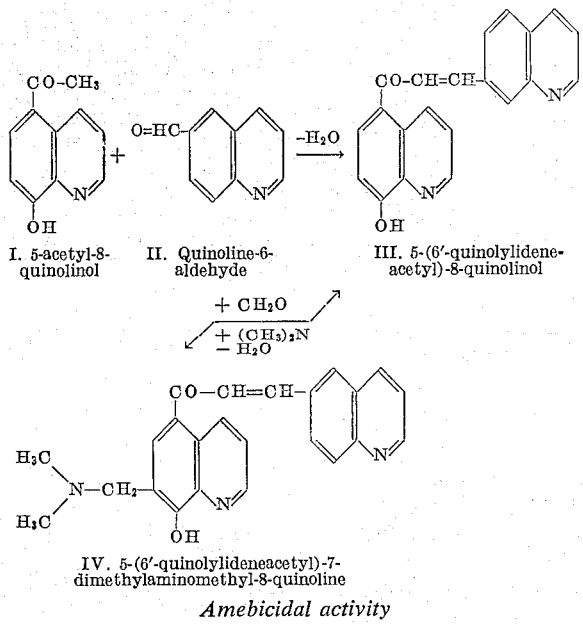

I. 5-acetyl-8-quinolinol    II. Quinoline-6-aldehyde    III. 5-(6'-quinolylidene-acetyl)-8-quinolinol IV. 5-(6'-quinolylideneacetyl)-7-dimethylaminomethyl-8-quinoline

Amebicidal activity

The lower limits of activity in amebiasis of rats was determined in the conventional manner and the following lower limits of activity were found for the following compounds: 5-chloro-7-diethyl-aminomethyl-8-quinolinol, 100 mg. per kg.; 5-cinnamoyl-7-dimethylaminomethyl-8-quinolinol, 25 mg. per kg.; 5-benzoyl-7-dimethyl aminomethyl-8-quinolinol, 25 mg. per kg.; 5-cinnamoyl-7-diethylaminomethyl-8-quinolinol, 50 mg. per kg.

In the claims, the terms "aryl radicals," "aralkyl radicals," "aralkenyl radicals," "heterocyclic radicals," and "heterocyclic alkyl radicals" include, in accordance with conventional terminology, radicals containing substituents. Thus, for example, this terminology would include chlorobenzoyl radicals, the chlorocinnamoyl radical, the dichlorobenzoyl radical and the benzoylacetyl radical.

We claim:

1. As a new chemical compound, a 5-acyl-7-tertiary aminomethyl-8-quinolinol of the general formula

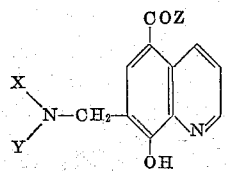

in which Z is a member of the group consisting of a phenyl, benzyl, phenethyl, styryl, phenylbutadiene, furfurylidenemethyl, thienylidenemethyl, and quinolylidenemethyl radical, and in which X and Y are members of the group consisting of lower alkyl radicals, the sum total of carbon atoms of which does not exceed 14 and further members wherein, taken together with —N<, they form a saturated heterocyclic radical of the class consisting of piperidino and pyrrolidino.

2. As a new chemical compound, 5-benzoyl-7-dimethylaminomethyl-8-quinolinol.

3. As a new chemical compound, 5-cinnamoyl-7-dimethylaminomethyl-8-quinolinol.

4. As a new chemical compound, 5-cinnamoyl-7-diethylaminomethyl-8-quinolinol.

5. As a new chemical compound, 5-(3',4'-dimethoxycinnamoyl)-7-dimethylaminomethyl-8-quinolinol.

6. Process for the production of substituted 8-quinolinols, which comprises reacting a 5-acyl-8-quinolinol of the general formula

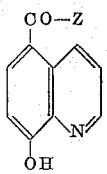

in which Z is a member of the group consisting of a phenyl, benzyl, phenethyl, styryl, phenylbutadiene, furfurylidenemethyl, thienylidenemethyl, and quinolylidenemethyl radical, with formaldehyde and a secondary amine, and recovering the 5-acyl-7-tertiary aminomethyl-8-quinolinol formed.

7. Process for the production of substituted 8-quinolinols, which comprises reacting a 5-acetyl-7-tertiary aminomethyl-8-quinolinol with a member selected from the group consisting of aromatic aldehydes and heterocyclic aldehydes, and recovering a 5-acyl-7-tertiary aminomethyl-8-quinolinol of the general formula

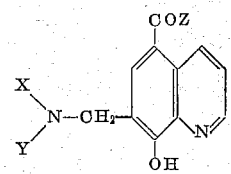

in which Z is a member of the group consisting of a phenyl, benzyl, phenethyl, styryl, phenylbutadiene, furfurylidenemethyl, thienylidenemethyl, and quinolylidenemethyl radical, and in which X and Y are members of the group consisting of lower alkyl radicals, the sum total of carbon atoms of which does not exceed 14 and further members, wherein, taken together with —N< they form a saturated heterocyclic radical of the class consisting of piperidino and pyrrolidino.

References Cited in the file of this patent

UNITED STATES PATENTS 2,681,910    Burckhalter    June 22, 1954

OTHER REFERENCES

Burckhalter et al.: JACS, vol. 68, p. 1900 (1946).
Burckhalter et al.: JACS, vol. 73, pp. 4837–39 (1951).